UNITED STATES PATENT OFFICE.

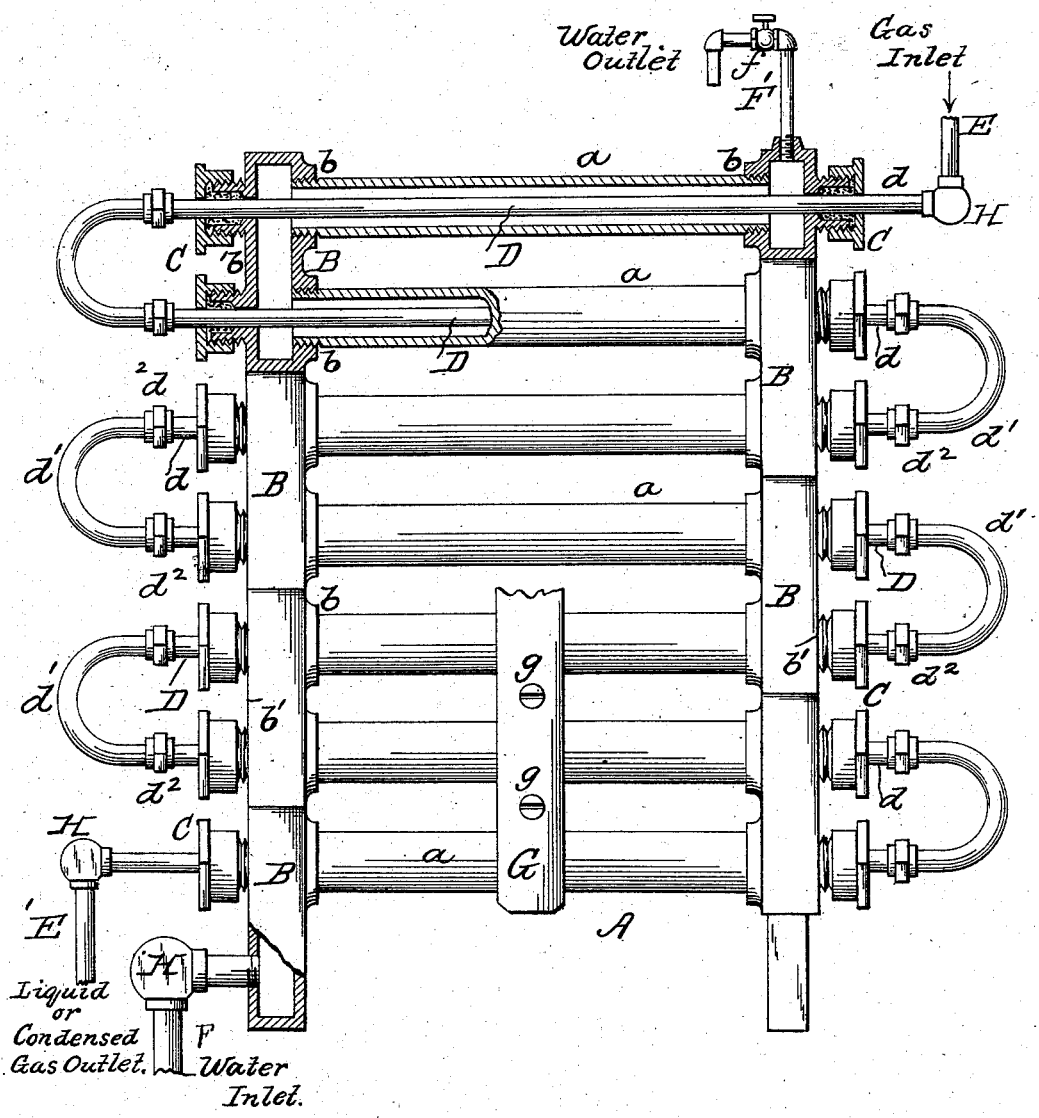

JOSEPH C. KLINE, OF PHILADELPHIA, PENNSYLVANIA.

CONDENSER FOR ICE-MACHINES.

SPECIFICATION forming part of Letters Patent No. 288,450, dated November 13, 1883.

Application filed May 29, 1883. (No model.)

*To all whom it may concern:*

Be it known that I, JOSEPH C. KLINE, a citizen of the United States, residing at Philadelphia, in the county of Philadelphia and State of Pennsylvania, have invented certain new and useful Improvements in Condensers for Ice-Making Machinery, of which the following is a specification, reference being had therein to the accompanying drawing, which is an elevation of a condenser, partly sectional, embodying my improvements.

My invention has relation to that class of condensers used in ice-making machines for cooling or liquefying the hot or compressed gas coming from the compressing-pump, and has for its object to avoid the straining or opening of the joints of the condenser by the unequal expansion of the gas and of the water-pipes or condenser-jackets.

My invention has for its further object to provide a simple, inexpensive, and durable condenser for ice-making machines.

My invention accordingly consists of the novel combination, construction, and arrangement of parts, as hereinafter more particularly described and claimed.

In the drawing, A represents the condenser-jacket, composed of pipes $a\,a$, which screw into alternate end couplings or oblong chambers, B B, as shown at $b$. These chambers are arranged one upon the other, so that each will have a firm support, and thus dispense with braces common in other forms of condensers. Upon the outer sides, $b'$, of the said couplings are formed stuffing-boxes C C, for the purpose of making a water or fluid tight joint between the couplings and the gas-pipes D D. The latter pass through said stuffing-boxes, couplings B, and pipes $a$, as illustrated, with their ends $d$ projecting beyond the stuffing-boxes, and are connected by means of the bends $d'$ and suitable couplings, $d^2$, to form a series of convolutions corresponding to those of the condenser-jacket or water-pipes $a\,a$. It will be seen that the pipes D extend beyond the jackets, and the couplings $d^2$ are unconnected with the couplings B B, so that the expansion and contraction of pipes D and jackets $a$ will have no effect upon each other. The inlet E of pipes D is designed to connect with the compressing-pump or gas-supply, and the outlet E' thereof leads to the refrigerating-tank.

F F' are respectively the induction and eduction ends of the condenser-jacket, the latter being provided with a cock, $f$, for regulating the volume of the flow of the cooling liquid therethrough. By such arrangement the pipes D D are not rigidly connected to the condenser-jacket, but have liberty of longitudinal movement in the stuffing-boxes C C, so that when the pipes D D and condenser-jacket are unequally expanded and contracted by the introduction thereinto of the hot gases and cooling liquid the pipes D D slide in the stuffing-boxes and all straining or opening of the joints of the condenser is avoided. The couplings B B are designed to be of cast metal and have the pipes $a$ screwed thereto; but, if desired, said parts may be cast integral with each other. When several or a series of condensers are placed side by side, they may be held in position by means of plates G and bolts $g$, in which case the outlet and inlet ends of pipes D and induction end of the condenser-jacket are provided with manifolds H, of any suitable construction.

While I have described my improvements as being especially applicable to condensers for ice-making machinery, yet I do not confine them thereto, as they may be employed for any and all kinds of condensers. So, too, while I have shown a convoluted form of condenser, I do not wish to be understood as limiting myself thereto, as any other suitable form or arrangement may be substituted therefor.

What I claim is—

1. A condenser composed of a series of jackets or tubes connected to end couplings or chambers seated upon each other, and having stuffing-boxes through which pass the tubes D D, substantially as shown and described.

2. In combination with the tubes D D, the jackets or tubes $a\,a$, connected to couplings or chambers B B, seated upon each other, and having stuffing-boxes C C, substantially as shown and described.

3. A condenser composed of pipes D D, partially inclosed by pipes or jackets $a\,a$, couplings B B, seated upon each other, and stuffing-boxes C C, substantially as shown and described.

4. The condenser herein shown and described, composed of pipes D D, jackets or pipes $a\,a$, couplings B B, seated upon each other, and with stuffing-boxes C C and valved outlet F'.

5. The condenser herein shown and described, composed of pipes D D, with bends $d'$ and couplings $d^2$, attached to pipes D, which extend outside the couplings B B, jackets or pipes $a\ a$, and said couplings B B with stuffing-boxes C C.

6. The combination of pipes D D, having bends $d'$ and couplings $d^2$, attached to pipes D, which extend outside couplings B B, the jackets or pipes $a\ a$, couplings B B, with stuffing-boxes C C and valved outlet F', substantially as shown and described.

7. A condenser composed of internal pipes passing through stuffing-boxes formed on end couplings, which are connected together by pipes or jackets, said pipes or jackets being connected together by couplings attached outside of said end couplings, substantially as shown and described.

In testimony whereof I affix my signature in presence of two witnesses.

JOSEPH C. KLINE.

Witnesses:
 JOHN RODGERS,
 S. J. VAN STAVOREN.